Patented Nov. 21, 1939

2,180,692

UNITED STATES PATENT OFFICE 2,180,692

PROCESS OF TREATING ORES

John S. Potter, Denver, Colo., assignor to The S. W. Shattuck Chemical Company, Denver, Colo., a corporation of Colorado No Drawing. Application November 6, 1935, Serial No. 48,604

10 Claims. (Cl. 23—19)

This invention relates to processes of treating ores; and it relates more particularly to processes of treating carnotite and similar ores for recovery of vanadium, uranium and radium values contained therein.

The problem of commercially treating ores containing vanadium and uranium, together with characteristic small amounts of radium, to extract from them the desired values, is one upon which a large amount of technical research and effort has heretofore been concentrated. Numerous methods have been proposed for the purpose, some of which have been actually practiced to a certain extent; but it is common knowledge that the known methods still leave much to be desired as regards simplicity and economy of operation as well as efficiency and completeness of extraction. It is a primary purpose of the present invention to provide a process, applicable to a wide variety of ores containing such values, which enables their recovery more simply and economically than heretofore and, in general, involves improvements in procedure that are a distinct advantage in commercially working such ores. A further and more specific object of the invention is to provide a process whereby the vanadium values may be separated and recovered largely as so-called iron vanadate in a form and condition especially suitable and advantageous for the manufacture of ferro-vanadium, and also enabling concomitant separation and recovery of the uranium and radium values.

With the foregoing objects in view, as well as others which will be apparent from the further disclosure hereinafter given, the invention comprises novel steps of procedure and combinations thereof which will be hereinafter described in connection with specific illustrative examples explanatory of the broad underlying principles involved, and which will then be more particularly pointed out in the appended claims.

In general, the process of the invention involves first rendering the vanadium and uranium values water soluble by treating the ore, either as such or in the form of concentrates, with sulphuric acid in any manner effective for the purpose but most desirably in the manner to be more particularly hereinafter described, and separating them by leaching, while also producing a slime concentrate carrying the radium values; evaporating to relatively thick consistency the leach solution or liquor containing vanadium and uranium values; roasting the resultant concentrated material under operating conditions so regulated and controlled that most or all of the contained vanadium values are converted into insoluble form without extensive conversion of the uranium values into insoluble form; and then leaching the roasted material to obtain uranium values in a solution from which they may be appropriately recovered, leaving the vanadium values wholly or largely in the form of a substantially water-insoluble residual concentrate well adapted for use in the manufacture of ferro-vanadium. An important feature of the new process in its most desirable practical embodiments consists in avoiding the use of any alkali compounds in the process until after the vanadium values have been separated, thus producing a high grade vanadium concentrate uncontaminated by added alkaline matter.

While the novel process can be utilized to advantage in recovering values of the character in question from ores of widely differing specific characteristics and composition, it has been found particularly well adapted for the treatment of oxidized ores of the type that may be generally classified as carnotite ores or vanadium ores; and in the further description of the process hereinafter given, reference will be made more particularly to the treatment of such ores without, however, intending thereby to restrict the scope of the invention thereto.

Generally, in the trade, a vanadiferous ore containing in excess of 1.5 per cent $U_3O_8$ is classed as a carnotite ore proper, while an ore containing a smaller proportion of uranium is classed as a vanadium ore; although both may be designated, broadly, as being of the carnotite type. In general, carnotite may be defined as a mineral of variable composition, usually a mixture of potassium uranyl vanadate and a calcium uranyl vanadate. Typical carnotite ores, to the treatment of which the process of the present invention is particularly well adapted, have the following variable composition:

Up to 8% vanadium pentoxide,
Up to 3% uranous-uranic oxide ($U_3O_8$),
5–25% moisture,
70 to 85% acid insolubles, mostly silica,
5 to 12% iron and aluminum oxides,
Traces to 3% lime, either as carbonates or sulphates,
Traces to 2% barium, either as carbonates or sulphates,
Traces to 2% copper, both carbonate and sulphide, and a varying fraction of a per cent lead;
Small amounts of sodium, potassium, magnesium, and other elements, including radium.

A typical average analysis of such a carnotite type of ore may be as follows:

|  | Per cent |
| --- | --- |
| Vanadium pentoxide | 2.85 |
| Uranous-uranic oxide (U₃O₈) | .43 |
| Aluminum oxide | 4.15 |
| Ferric oxide | 3.26 |
| Calcium oxide | .85 |
| Magnesium oxide | .81 |
| Lead oxide | .13 |
| Silicon dioxide, insoluble | 84.10 |
| Copper | .10 |
| Balance, including sodium and potassium oxides, water, etc. | 3.32 |
|  | 100.00 |

In treating such an ore (which the trade would term a vanadium ore) in accordance with the process of the invention, the ore is first ground to reasonably small particle size but most desirably in a manner that will produce as small a percentage of fines as is reasonably possible. A large proportion of fines not only increases undesirably the volume of material to be treated but also the cost of recovering radium values from the insoluble residue left from the acid treatment. In practice, it is found satisfactory to reduce the ore (or concentrate) to a fineness of about 25-mesh or even somewhat coarser; and if the grinding is properly carried out, it is possible to accomplish this reduction with production of a relatively small proportion of fines.

The ground ore is next moistened with a limited amount of water. Most desirably, the amount of water is such as will approximately equal the volume of the acid to be subsequently added. Next, the calculated necessary amount of strong sulphuric acid (e. g. 66° Bé.) is thoroughly mixed into the moistened ore. This operation should be conducted as rapidly as possible, and the resultant mixture should be of a consistency similar to that of mortar or concrete mixtures employed in pouring structural foundations. This mixture is poured into a pile and allowed to stand for a period of time sufficient to effect the desired solubleization of the vanadium and uranium values, by which time the mass will usually have solidified. It is then broken up preparatory to further treatment which will be presently described. As a rule, it is necessary to permit the thickly-fluid mixture of ore and acid to stand for at least about twenty-four hours in order to effect the desired solubleization of values. In the case of certain ores such, for example, as roscoelite (a vanadium silicate), which are more resistant to attack by the acid, a considerably longer period of standing may be found necessary to render soluble the values in question. The necessary time for allowing the mixture to stand may of course be ascertained and fixed in any given instance by determining from test samples the extent to which the values have been rendered soluble.

The above-described solubleizing treatment may be characterized as more or less of a "soaking-out" process. The heat of reaction is the only heating necessary to render the values soluble, and in the most desirable mode of practicing the invention, this self-heating of the mixture is relied upon entirely. This is especially important in order to avoid fixing the radium values throughout the residues and thereby preventing its separation as a slime with good recoveries, and also to avoid producing an excessive quantity of slimes. It is to be understood, however, that in the broad aspects of the invention, particularly where recovery of radium from an ore containing it in extremely minute quantity is not involved, external or supplemental heating is not excluded. In general, it requires approximately 600 pounds of concentrated (66° Bé.) sulphuric acid per ton of ore containing up to 5 per cent of combined uranium and vanadium oxides, with the further addition of about 100 pounds of 66° acid for each additional per cent of uranium and vanadium values in the ore. Greater amounts of sulphuric acid may be necessary in treating certain ores containing excessive amounts of acid-soluble constituents; but in the case of any given ore, the necessary proportion and quantity of acid to be employed may be determined from an analysis of the ore and from the general rule just given.

The solidified mass resulting from the "soaking-out" solubleizing procedure having been broken up into convenient fragment or particle size, the material is then subjected to leaching with water, the volume of water used being most desirably limited to no more than is necessary to ensure adequate extraction of the soluble values, and at the same time to give sufficient dilution to permit effective separation of the slimes and fine sands. In a typical instance, satisfactory leaching is accomplished by using about 500 gallons of water for each ton of ore represented in the ore-acid mixture. Most desirably, the wash water from a previously leached batch of ore is used in place of plain water for the initial leaching. The leaching operation may be carried out in a tank equipped with one or more agitators. A leaching classifier of well known type and unnecessary to describe in detail here may be used to advantage in actual practice, the agitators being run until the material is entirely broken up, which usually requires from one-half to three-quarters of an hour, although this is merely illustrative of good practice and is not to be understood as restrictive.

After the agitators are stopped, sufficient time, usually on the order of from ten to twenty minutes, is allowed for the sands to settle. The solution carrying vanadium and uranium values, as well as suspended slimes, is then separated from the settlings and further treated for removal of the suspended slimes. This may be effected in any suitable manner, as by siphoning off the solution with suspended slimes from the settled sands and either running it into settling tanks or through a filter press. Usually it is possible to siphon the solution off right down to the sands in the bottom of the tank without drawing off any of the sand through the siphon.

The drawn-off leach solution, freed of suspended slimes, for example by passage through a filter press, becomes the rich or stock solution to be further treated for separation of the vanadium and uranium values from each other. The slimes, after being washed in the filter press and dried, are ready for treatment in any known or suitable manner for the recovery of the radium content, the slimes commonly amounting to only approximately 100 pounds per ton of ore treated and yet carrying practically all the radium values of the ore. The settled sands remaining in the agitator are washed with plain water, most desirably several times, for removal of adhering soluble values and slimes. It is good practice to subject the sands to four consecutive washes with plain water, using approximately 100 gallons (per ton of original ore treated) in each washing, this washing being conducted in the agitator with rapid agitation in order to secure effective washing action. After each wash, sufficient time is allowed for settling of the sands, and the wash water containing additional slimes is then siphoned off. The combined wash waters are then employed to leach a fresh batch of material resulting from the "soaking-out" solubleizing procedure hereinabove described.

The clear stock solution containing most of the vanadium and uranium values present in the original ore or ore concentrate treated, obtained either by filtering or by settling, is now concentrated by evaporation. Most desirably, the evaporation is carried to the point where the consistency of the residual material approaches that of thick mud. This concentrated material is next subjected to a roasting treatment so conducted and controlled as to favor conversion of the contained vanadium values into substantially water-insoluble form, while avoiding, so far as is reasonably possible, rendering the contained uranium values insoluble. This involves careful adjustment and control of the roasting temperatures in such manner that they will be high enough to effect dissociation of vanadyl sulphate, together with some of the accompanying iron sulphate, while avoiding roasting temperatures high enough to decompose uranyl sulphate or the sulphates of aluminum and magnesium also present. In practice, it is found possible, if the roasting operation is carefully controlled, to effect nearly complete decomposition of vanadyl sulphate and ferrous sulphate without decomposing any substantial amount of the other three sulphates mentioned. It is important to avoid localized overheating of the material being roasted since this would decompose uranium sulphate in those parts of the material affected. It is also important that the roasting be thorough in order to effect substantially complete oxidation of the vanadium values and a large part of the iron present. Under these conditions, the vanadium values are converted largely into so-called iron vanadate. This oxidizing roast may be carried out in any suitable type of furnace, the use of a reverberatory furnace equipped for either hand or mechanical rabbling giving satisfactory results in practice.

The maximum temperature attained during the roasting may vary somewhat in practice, depending upon the particular type of ore being worked and its specific composition. Generally speaking, the temperature should be at least about 550° C. during the major part of the roasting period; and it is usually best not to permit the roasting temperature to exceed about 650° C., a substantially lower maximum temperature being ordinarily high enough and distinctly preferable. Where the ore is of the type employed in the present specific illustrative example, it is found that most satisfactory results are attained when the roasting temperature is held at approximately 600° C. for the greater part of the roasting period and is not permitted to substantially exceed that figure. It is also found that this temperature, or one lying within the approximate range of 590° to 610° C., is optimum for most ores to be treated in accordance with the principles of the invention. If the roasting temperature is insufficiently high, conversion of the vanadium values into insoluble form is too incomplete; while if the roasting temperature is too high, there is rather extensive decomposition or uranium sulphate, with the result that the iron vanadate will have an undesirably high insoluble uranium content. However, it is possible to remove excess uranium from the iron vanadate by leaching with dilute nitric acid and boiling; but since this involves an additional step, it is of course better practice to hold the roasting temperature down to a maximum insufficiently high to cause extensive decomposition of the uranium sulphate.

Next, the roasted material is leached with water, thereby dissolving most of the uranium values, practically all of the aluminum and a good portion of the iron, substantially all the vanadium values remaining undissolved if the roasting has been properly conducted. Most desirably, the leaching is effected in the cold, without the use of any heat whatever; and it is of great advantage to use a relatively very pure water, especially one having virtually no alkali or alkaline content. The use of water containing an alkali compound, e. g. sodium or potassium sulphate, would tend to cause vanadium to go into solution to an undesirable extent. Leaching the roast product in the cold has the advantage that in this way the greatest possible proportion of the ferric sulphate content can be gotten into solution and held therein as such; whereas hot leaching would cause more or less complete hydrolysis or conversion of the ferric sulphate to ferric oxide and free sulphuric acid, the latter acting to carry some vanadium into solution and thus reduce appreciably the vanadium content of the residual iron vanadate product. The leach is run into a filter press, the clear leach solution being appropriately treated for recovery of its uranium content as will be presently described. The filter cake of iron vanadate is washed with water until free from sulphates, and after being dried is ready for use in the manufacture of ferro-vanadium. In a typical instance, it contains approximately 50 per cent vanadium pentoxide, this percentage running even higher in many cases. A small percentage of uranous-uranic oxide may also be present; but where the roasting operation has been carried out under optimum conditions, this percentage is so small as to be unsubstantial. Ferric oxide is also present in proportions characteristic of so-called iron vanadate.

The iron vanadate concentrate is a particularly suitable and valuable material for making ferro-vanadium because the above described process of obtaining it does not involve the use of any alkali which, if present in even very small quantity in a vanadium concentrate, causes heavy losses through volatilization in the manufacture of ferro-vanadium therefrom. Such losses may be as large as ten times the amount of alkali introduced into the vanadium concentrate. The present process produces a notably high-grade vanadium concentrate in this respect especially.

The uranium values contained in the filtered leach solution from the roast may desirably be recovered in the manner now to be described. Pulverized limestone is carefully added in quantity just sufficient to effect selective precipitation of only the iron and aluminum present. After separation of the precipitated iron and aluminum by filtration or settling, more pulverized limestone is added to the solution, the uranium being then precipitated, and recovered in any suitable manner as by filter-pressing. This precipitate constitutes the uranium concentrate and may be purified by any of the well known methods.

In the above described method of fractional precipitation for recovery of uranium from the solution, it is very important that both the iron and uranium be in the highest state of oxidation; otherwise, reduced uranium will be precipitated in the first stage with the aluminum, and reduced iron will be precipitated in the second stage with uranium. Various known methods of insuring complete oxidation of both the iron and uranium in the solution, prior to carrying out the fractional precipitation, are available and may be employed. The fractional precipitation should be conducted in equipment having no iron or steel parts exposed to the action of the solution, in order to avoid reduction of iron and uranium.

What is claimed is:

1. The process of treating ore containing vanadium and uranium values which comprises subjecting such ore to the action of sulphuric acid until a major portion of said values is rendered soluble, leading the acid-treated material to extract solubleized values therefrom, separating the resultant leach solution and concentrating it by evaporation, roasting the resultant concentrated product under conditions sufficiently oxidizing and at temperatures high enough to convert the vanadium values largely into insoluble form, while avoiding temperatures high enough to render insoluble a large proportion of the uranium values, and leaching the resultant roast to extract uranium values, leaving a residue relatively high in vanadium.

2. The process defined in claim 1, wherein the maximum roasting temperature attained lies between the approximate limits of 550° and 650° C.

3. The process defined in claim 1, wherein the major part of the roasting is effected at between 590° and 610° C.

4. The process defined in claim 1, wherein the major part of the roasting is effected at approximately 600° C.

5. The process of treating ore containing vanadium and uranium values which comprises moistening such ore in comminuted condition with water, then mixing concentrated sulphuric acid with the comminuted ore and allowing the ensuing reaction to proceed until the mixture becomes substantially solid, breaking up the solidified mass and leaching with water, separating the leach liquor and concentrating it by evaporation to relatively thick consistency, thoroughly roasting the resultant concentrated material under oxidizing conditions at temperatures in the neighborhood of 600° C., leaching the roasted material with cold water to extract uranium and other soluble values therefrom, separating the leach solution from the residual vanadium concentrate, and recovering uranium values from the leach solution.

6. The process defined in claim 5, wherein the particle size of the greater part of the comminuted ore, when the acid is initially mixed with it, is not substantially smaller than about 25-mesh.

7. The process defined in claim 1, wherein the ore, previous to acid treatment, is so ground that the major portion of it is 25-mesh or coarser, with a relatively small proportion of fines.

8. The process of treating ore containing vanadium, uranium and radium values which comprises moistening such ore in comminuted condition with water, mixing concentrated sulphuric acid with the comminuted ore and allowing the mixture to stand until the ensuing reaction is substantially complete without the aid of external heating, breaking up the resultant solidified mass and leaching with cold water to dissolve vanadium and uranium values and obtain a suspension of the radium-bearing slimes in the solution, separating the leach liquor together with suspended radium-bearing slimes from residual sands, then separating said slimes from the leach liquor, concentrating by evaporation the vanadium and uranium values contained in the clarified liquor, thoroughly roasting the resultant concentrate under oxidizing conditions and within a temperature range sufficiently high to decompose vanadium and iron sulphates but insufficiently high to decompose uranium and aluminum sulphates, leaching the roasted material with cold water to extract uranium values and other solubles therefrom, separating the leach solution from the residual vanadium concentrate, and recovering the uranium values from the leach solution by fractional precipitation.

9. In a process of treating a vanadiferous ore carrying uranium and radium values, the steps which include preparing a relatively thick mixture of the ore, in comminuted condition but not comprising a large proportion of fines, with strong sulphuric acid, allowing the ensuing reaction to take place substantially by the heat of reaction alone, breaking up the resultant reaction mass and leaching with water to obtain a leach liquor containing dissolved vanadium and uranium values, together with radium-bearing slimes suspended therein, separating from the residual sands said leach liquor with the suspended slimes, and then separating said slimes from the leach liquor as a radium-bearing concentrate.

10. In a process of treating a vanadiferous ore carrying uranium and radium values, the steps which include preparing a relatively thick mixture of the ore, in comminuted condition not finer than substantially 25-mesh, with strong sulphuric acid, allowing the ensuing reaction to take place substantially by the heat of reaction alone, breaking up the resultant mass and leaching with water to obtain a leach liquor containing dissolved vanadium and uranium values, together with radium-bearing slimes suspended therein, separating from the residual sands said leach liquor with the suspended slimes, and then separating said slimes from the leach liquor as a radium-bearing concentrate.

JOHN S. POTTER.